United States Patent
Wu

(10) Patent No.: US 11,637,436 B2
(45) Date of Patent: Apr. 25, 2023

(54) AUTOMOBILE JUMPSTART ADAPTER FOR AN EXTERNAL BATTERY

(71) Applicant: Jiasheng Wu, Reading, MA (US)

(72) Inventor: Jiasheng Wu, Reading, MA (US)

( * ) Notice: Subject to any disclaimer, the term of this patent is extended or adjusted under 35 U.S.C. 154(b) by 0 days.

(21) Appl. No.: 16/843,690

(22) Filed: Apr. 8, 2020

(65) Prior Publication Data
US 2021/0111574 A1    Apr. 15, 2021

(30) Foreign Application Priority Data
Oct. 22, 2019 (CN) .......................... 201921780240.2

(51) Int. Cl.
| | |
|---|---|
| *H02J 7/00* | (2006.01) |
| *H01M 10/46* | (2006.01) |
| *H02J 7/34* | (2006.01) |
| *H02J 1/10* | (2006.01) |
| *H01M 50/20* | (2021.01) |
| *H01M 50/543* | (2021.01) |

(52) U.S. Cl.
CPC ........... *H02J 7/0045* (2013.01); *H01M 10/46* (2013.01); *H01M 50/20* (2021.01); *H01M 50/543* (2021.01); *H02J 1/122* (2020.01); *H02J 7/0068* (2013.01); *H02J 7/342* (2020.01); *H02J 2207/30* (2020.01)

(58) Field of Classification Search
CPC ........ H02J 7/0045; H02J 7/342; H02J 7/0068; H02J 1/122; H02J 2207/30; H02J 7/0034; H01M 50/20; H01M 50/543; H01M 10/46; H01M 10/0525; H01M 50/204; B60L 53/53; B60L 53/16; B60L 3/0046; Y02E 60/10

USPC .................................................. 320/107, 105
See application file for complete search history.

(56) References Cited

U.S. PATENT DOCUMENTS

| | | | | |
|---|---|---|---|---|
| 7,301,303 B1 * | 11/2007 | Hulden | ............... | H01M 50/291 429/96 |
| 8,076,900 B1 * | 12/2011 | Brown | .................... | F02N 11/14 320/105 |
| 8,235,552 B1 * | 8/2012 | Tsuge | .................. | F21V 33/0056 362/253 |
| 9,620,989 B2 * | 4/2017 | Meoli | ..................... | H02J 7/027 |
| 10,096,996 B1 * | 10/2018 | Lin | ........................... | H02J 7/00 |
| 10,305,295 B2 * | 5/2019 | Kelly-Morgan | ........ | H02J 1/102 |

(Continued)

FOREIGN PATENT DOCUMENTS

| | | | | |
|---|---|---|---|---|
| CA | 3064303 A1 * | 11/2018 | ............ | H01M 10/48 |
| CN | 202651833 U * | 1/2013 | | |

(Continued)

*Primary Examiner* — M Baye Diao
(74) *Attorney, Agent, or Firm* — Polsinelli PC

(57) ABSTRACT

The utility model refers to an automobile start-up adapter, wherein it comprises a shell and a circuit board provided inside the shell. The shell is provided with an input terminal for electrically connecting with an output terminal of a lithium battery of a power tool and an output terminal for electrically connecting with a clamp. The input terminal and the output terminal are communicated through a circuit board, and a voltage identification circuit and a voltage conversion circuit are provided on the circuit board. The automobile start-up adapter of the utility model can use the lithium battery of the hand-held electric tool to supply power for the emergency start-up of the automobile.

20 Claims, 5 Drawing Sheets

(56) References Cited

U.S. PATENT DOCUMENTS

| | | | | |
|---|---|---|---|---|
| 10,404,079 B2* | 9/2019 | Meoli | ............... | H01M 10/46 |
| 10,436,435 B2* | 10/2019 | Wu | ............... | F21V 21/06 |
| 11,045,572 B1* | 6/2021 | Kim | ............... | B01F 23/20 |
| 11,114,874 B2* | 9/2021 | Lin | ............... | B25F 5/02 |
| 2006/0097692 A1* | 5/2006 | Chen | ............... | H02J 7/0042 |
| | | | | 320/107 |
| 2009/0174362 A1* | 7/2009 | Richardson | ............ | F02N 11/14 |
| | | | | 320/105 |
| 2011/0068734 A1* | 3/2011 | Waldron | ............... | H02J 7/0042 |
| | | | | 320/107 |
| 2015/0091392 A1* | 4/2015 | Hwang | ............... | H02J 7/0045 |
| | | | | 307/150 |
| 2018/0102706 A1* | 4/2018 | Gao | ............... | H02M 3/02 |
| 2018/0294662 A1* | 10/2018 | Polakowski | ............ | H02J 7/0045 |
| 2019/0081472 A1* | 3/2019 | Guo | ............... | H02J 7/0034 |
| 2020/0072177 A1* | 3/2020 | Clarke | ............... | H02J 7/342 |

FOREIGN PATENT DOCUMENTS

| | | | | |
|---|---|---|---|---|
| CN | 205930421 U * | 2/2017 | ............... | B60N 3/14 |
| JP | 5204695 B2 * | 6/2013 | ............... | H04B 1/18 |
| WO | 2017167210 A1 | 10/2017 | | |
| WO | WO-2017167210 A1 * | 10/2017 | ............... | H02J 7/14 |
| WO | WO-2019143427 A1 * | 7/2019 | ............... | B60S 5/04 |

\* cited by examiner

AUTOMOBILE JUMPSTART ADAPTER FOR AN EXTERNAL BATTERY

CROSS-REFERENCE TO RELATED APPLICATION

This application is related to and claims priority under 35 U.S.C. § 119(b) from Chinese Patent Application No. 201921780240.2, filed Oct. 22, 2019, which is incorporated by reference herein in its entirety.

TECHNICAL FIELD

Aspects of the present disclosure relates to the technical field of emergency start-up of automobile devices, and, in particular, relates to an automobile start-up adapter.

BACKGROUND

The start-up of the typical automobile or electric vehicle is completed by electricity provided by the vehicle battery (e.g., a car battery, etc.). Often, after the vehicle battery is used for a long time, wear and tear results in the car battery being unable to store and/or provide electricity (e.g., the car battery "dies"), causing the automobile to fail to start normally.

At present, there are two solutions to the above problems. One is to jumpstart the dead battery by connecting it to other automobiles. This method needs to find an automobile that is just nearby and meets the connection conditions. Generally, the waiting time for rescue is long. Alternatively, a dead car battery can be jumpstarted by a portable emergency starting power supply, which does not require waiting a long time for rescue. However, the need for emergency start-up power is infrequent and if the typical emergency start-up power that is carried in the automobile has not been charged within a sufficiently recent timeframe, there may be insufficient stored energy in the portable emergency starting port supply and so it cannot be used to start the automobile.

An electric tool is a mechanized tool that uses a motor as its power and drives the working head with a power transmission mechanism. Many European and American households maintain a supply of electric tools. Further, in many cases, an appropriate power tool is often kept in a respective family car for emergency needs. At present, the specifications of rechargeable lithium batteries that are usually configured for hand-held power tools are 18V, 20V, or 24V, and the starting voltage of automobiles is generally 12V. As a result, rechargeable lithium batteries for hand-held power tools cannot be directly used for jumpstarting a vehicle.

It is with these observations in mind, among others, that various aspects of the present disclosure were conceived.

SUMMARY

In some aspects, provided herein is an automobile jumpstart adapter comprises: a shell comprising an input terminal, a jumpstart output terminal, and a circuit board disposed within the shell; and the shell comprising a voltage identification circuit and a voltage conversion circuit; wherein the input terminal is configured to electrically connect to a portable battery output terminal and the jumpstart output terminal, the voltage identification circuit identifies an appropriate output voltage corresponding to a vehicle battery and the voltage conversion circuit converting power from the portable battery to the appropriate output voltage.

In some embodiments, the shell further comprises a power base configured to receive the portable battery, and the input terminal is located on the power base.

In some embodiments, a locking structure is disposed between the power base and the portable battery. In some examples, the locking structure is configured to secure the shell to the portable battery when the portable battery is electrically connected to the input terminal.

In some specific examples, the locking structure comprises one or more convex ribs and one or more grooves, and the one or more convex ribs extending from one or another of the shell or the portable battery, and the one or more grooves extending from the other of the shell or the portable battery, wherein the one or more convex ribs are inserted into the one or more grooves when the portable battery output terminal is electrically connected to the input terminal. In some examples, the locking structure further includes one or more notches and one or more elastic clamping blocks, the one or more notches a part of one or another of the shell or the portable battery, and the one or more elastic clamping blocks from the other of the shell or the portable battery, wherein the one or more elastic clamping blocks are inserted into the one or more notches when the portable battery output terminal is electrically connected with the input terminal.

In some embodiments, the circuit board further comprises at least one of a short circuit protection circuit, a reverse connection protection circuit, or a reverse charging protection circuit, and wherein the reverse connection protection circuit is connected to a buzzer.

In some embodiments, the shell further comprises a power switch and a power indicator, the power switch and the power indicator respectively connected to the circuit board. Alternatively or in addition, the shell further comprises one or more of a USB interface, a USB indicator, or a USB switch, and wherein the USB interface and the jumpstart output terminal are arranged on one side of the shell.

In some embodiments, the automobile jumpstart adapter disclosed herein may further comprise a dust cover for shielding the USB interface and the jumpstart output terminal.

In other aspects, provided herein is a method for jumpstarting an automobile, the method comprising: receiving, at a shell, power from a portable battery at a first voltage; identifying, by a voltage identification circuit, an appropriate voltage corresponding to a vehicle battery; converting, by a voltage conversion circuit, the received power to the appropriate voltage identified by the voltage identification circuit; and providing to the vehicle battery the received power converted to the appropriate voltage.

In some embodiments, the method may further comprise locking the portable battery into the shell. In some examples, locking the portable battery into the shell further comprises inserting one or more convex ribs into one or more grooves. In some examples, the one or more convex ribs is disposed on the portable battery and the one or more grooves is disposed on the shell. In some examples, the one or more convex ribs is disposed on the shell and the one or more grooves is disposed on the portable battery. In some examples, locking the portable battery into the shell further comprises inserting one or more notches into one or more elastic clamping blocks.

In some embodiments, the one or more notches is located on the shell and the one or more clamping blocks is located on the portable battery. In some examples, the one or more notches is located on the portable battery and the one or more clamping blocks is located on the shell.

In some embodiments, any of the methods disclosed herein may further comprise buzzing a buzzer in response to an incorrectly configured electrical connection between one of the portable battery and the shell or the shell and the vehicle battery, wherein the buzzer is connected to one of a short circuit protection circuit, a reverse connection protection circuit, or a reverse charging protection circuit.

In some embodiments, the method may further comprise powering, through a USB interface disposed upon the shell, a device using power from the portable battery.

The details of one or more embodiments of the invention are set forth in the description below. Other features or advantages of the present invention will be apparent from the following drawings and detailed description of several embodiments, and also from the appended claims.

DETAILED DESCRIPTION

Figure 1:
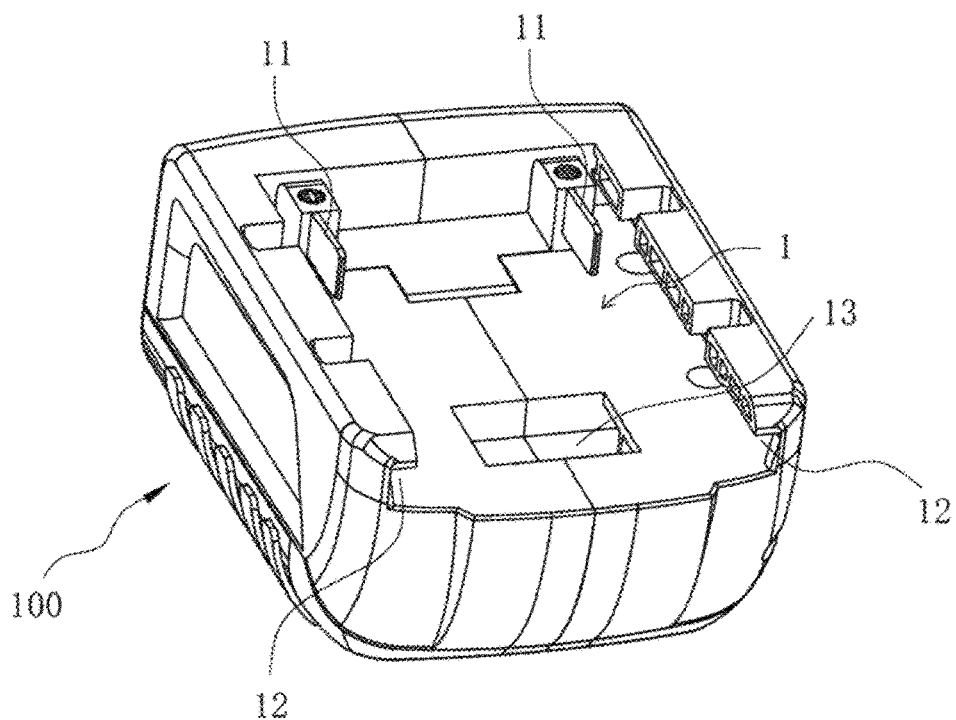
FIG. 1 is a perspective structural view of one face of a jumpstart adapter, in accordance with the subject technology.
Figure 2:
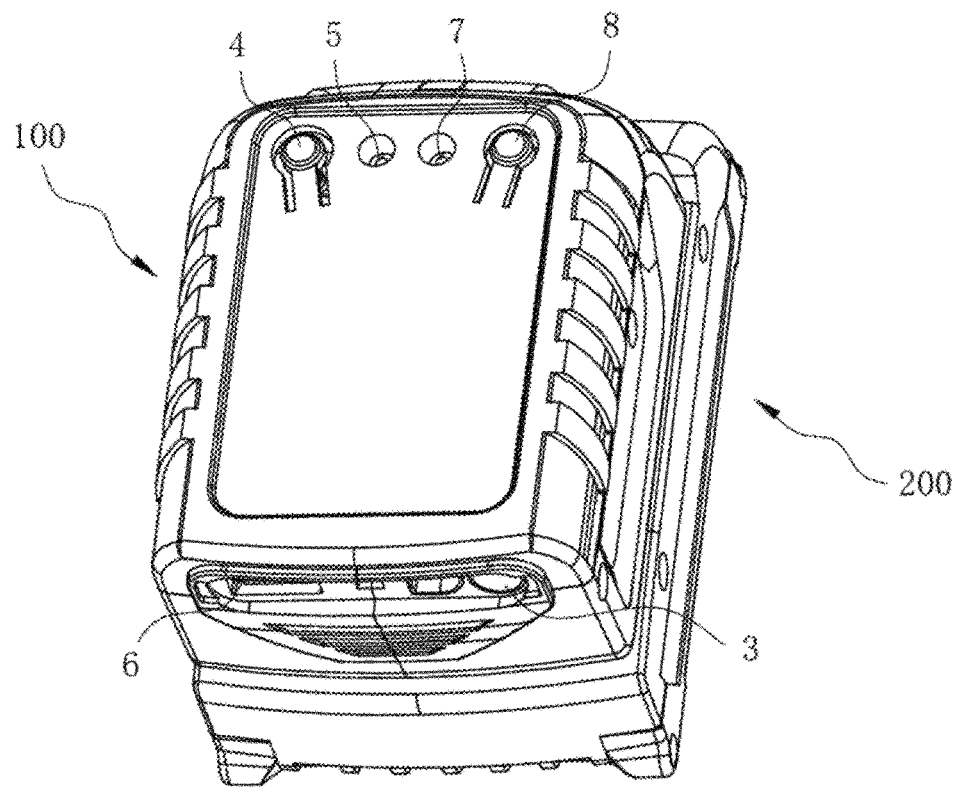
FIG. 2 is a perspective structural view of a second face of a jumpstart adapter, in accordance with the subject technology.

This disclosure includes systems and devices for using a lithium battery, such as, for example and without imputing limitation, of a hand-held power tool to power an automobile for emergency start-up.

In one example, a jumpstart adapter includes a shell and a circuit board provided inside the shell. The shell is provided with an input terminal for electrically connecting with an output terminal of a lithium battery of a power tool and an output terminal for electrically connecting with a clamp. The input terminal and the output terminal are communicated through a circuit board, and a voltage identification circuit and a voltage conversion circuit are provided on the circuit board.

Starting voltage of a consumer vehicle is generally 12V, and the voltage of a portable battery of a hand-held power tool is generally 18V, 20V, or 24V. In some examples, the portable battery is a lithium battery (e.g., Hitachi®, Dewalt®, Milwaukee®, Makita®, RIDGID®, Kobalt®, Worx®, Craftsman®, Hilti®, Metabo®, Black & Decker®, etc. brand lithium batteries for power tools) The output terminal of the portable battery can be electrically connected with the input terminal of the shell. The voltage of the connected portable battery can then be converted into an appropriate starting voltage (e.g., 12V) for the vehicle through via a voltage identification circuit and a voltage conversion circuit. Converted power from the portable battery is then output to the vehicle through a clamp attached to the output terminal of the shell to supply power for the emergency start-up of the vehicle.

Thus, the jumpstart adapter can be used to convert power from portable batteries of commonly used hand-held electric tools to an appropriate voltage for emergency starting of a vehicle. As a result, a car with a dead battery can be jumpstarted without needing to find and wait for other vehicles, or spending a potentially long period of time waiting for a rescue team.

The shell is provided with a power supply base for the plug-in setting of the battery, and the input terminal is arranged in the power supply base to facilitate the electrical connection between the input terminal and the output terminal of the lithium battery.

A locking structure may be included between the shell and the lithium battery to secure the lithium battery in place during jumpstarts and make the connection between the battery and the power socket more secure.

In some examples, the locking structure is disposed between a base of the shell and the battery, in order to make the overall appearance of the portable battery and the jumpstart adapter more aesthetically pleasing.

In particular, the locking structure may include convex ribs and grooves. The convex ribs may be provided on either a power socket of the shell or the portable battery itself, while the groove may be correspondingly provided in the other of them. When the output terminal of the portable battery is electrically connected to the input terminal of the shell, the convex rib (of the portable battery or the power socket) is inserted into the groove (of the power socket or the portable battery, respectively).

In some examples, there may be two grooves respectively provided on two sides of the power socket. Likewise, there may be two ribs provided on two sides of the portable battery in a one-to-one correspondence with the grooves. When the output terminal of the portable battery is electrically connected with the input terminal of the shell, the matching designs of the ribs and grooves can limit movement of the portable battery with respect to vertical directions and/or horizontal directions relative to the power supply base of the shell. In at least one example, the two convex ribs may be provided on both sides of the portable battery, and the two grooves may be provided on both sides of the power socket.

In some examples, the locking structure may further include a notch and an elastic clamping block. The notch may be provided in either the bottom of the power supply base or the portable battery, while the elastic clamping block may be respectively provided in the other of them. When the output terminal of the portable battery is electrically connected with the input terminal of the shell, the elastic clamping block may be inserted into the notch. When the output terminal of the portable battery is electrically connected with the input terminal of the shell, the elastic clamping block and the notch together limit forward and backward movement of the portable battery relative to the power supply base.

In order to make jumpstarting the vehicle safer, at least one of a short circuit protection circuit, a reverse connection protection circuit, or a reverse charging protection circuit may be provided on the circuit board or in the clamping block. Additionally, in some examples, a buzzer may be provided on the circuit board and configured to respond (e.g., buzz) to the reverse connection protection circuit.

In some examples, the shell may include a power switch and/or a power indicator, which are in communication with the circuit board to facilitate control of the emergency start-up power supply of the vehicle.

Further, the shell is provided with a USB interface, a USB indicator and a USB switch which communicate with the circuit board. The USB interface and the output terminal of the shell are disposed on the same side of the shell, and the shell is provided with a dust cover for shielding the USB interface and the output terminal. The USB interface can facilitate supply of power to smart terminal devices, such as, for example and without imputing limitation, mobile phones and tablet computers. The dust cover can prevent dust from entering the USB interface and the output terminals.

In general, the output terminal of the commonly used portable battery (e.g., of a hand-held power tool) is electrically connected to the input terminal of the shell, and the voltage of the portable battery is converted into an appropriate starting voltage required by an automobile being jumpstarted. Voltage conversion is accomplished through a voltage recognition circuit and a voltage conversion circuit. The portable battery is electrically connected to the shell output through the voltage recognition and voltage conversion circuits and a clamp may be applied to the shell output to power the automobile start-up (e.g., where the car battery is dead, etc.). The power socket of the shell is of an appropriate shape to facilitate the electrical connection between the output terminal of the shell and the input terminal of the portable battery, and the corresponding locking structure secures and improves the electrical connection between the portable battery and the power socket.

As a result, the portable battery can stably supply power for an emergency start-up of the automobile. Additionally, by being equipped with a variety of protection circuits, the emergency start-up power supply is safer. It can manually control the emergency start-up power supply of the automobile, and also supply power for intelligent terminal equipment.

The utility model is further described in detail below with reference to FIGS. 1-7 depicting various embodiments of the technology disclose above. It is understood that the embodiments depicted in the figures are presented for purposes of understanding and explanation and not to be taken as unduly limiting. Variations on the systems, methods, and devices disclosed herein may be implemented (e.g., in altered order, with additional or fewer steps, of modified shape, form, or configuration, etc.) without departing from the spirit and scope of the disclosure.

FIGS. 1-6 show one embodiment of the automobile jumpstart adapter. As shown in FIGS. 1-6, the automobile jumpstart adapter includes a shell 100. The shell 100 is provided with a power socket 1, an output terminal 3, a power switch 8, a power indicator 7, a USB interface 6, a USB indicator 5, a USB switch 4, and a dust cover 9.

In FIGS. 2 and 4-6, a lithium battery 200 (e.g., a portable battery) of a power tool is attached to the shell 100. The power socket 1 is used for plugging in the lithium battery 200. The power socket 1 is provided with an input terminal 11 that, when the lithium battery 200 is attached to the shell 100, is electrically connected to an output terminal 21 of the lithium battery 200. The output terminal 3 may be electrically connected to a wire clamp (not depicted). Wire clamps are well known in the art and most wire clamps can be used.

The input terminal 11 and the output terminal 3 are communicatively and conductively coupled through a circuit board provided in the shell 100, and the circuit board may include a voltage identification circuit and a voltage conversion circuit. The lithium battery 200 is plugged into the power socket 1 and the output terminal 21 of the lithium battery 200 is electrically connected to the input terminal 11. The voltage of the lithium battery 200 is converted into the starting voltage required by the automobile through a voltage identification circuit and a voltage conversion circuit. The power is supplied for the emergency start of the automobile through the output of a wire clamp electrically connected to the output terminal 3.

Figure 3:
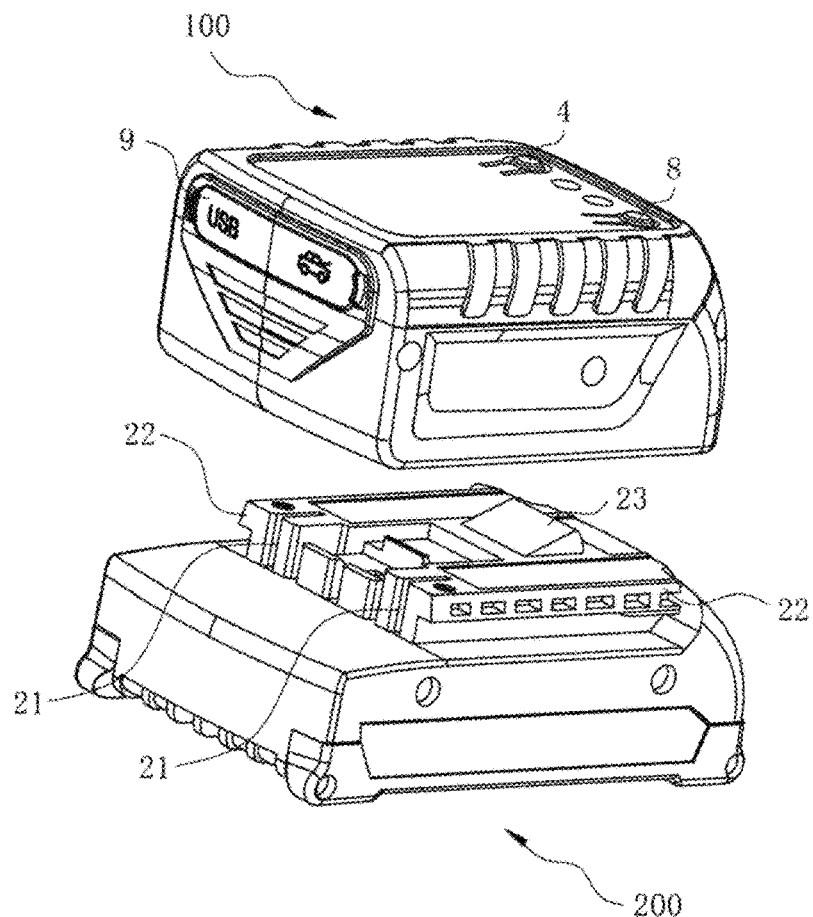
FIG. 3 is a partially exploded view of the jumpstart adapter of FIG. 2, in accordance with the subject technology.
Figure 4:
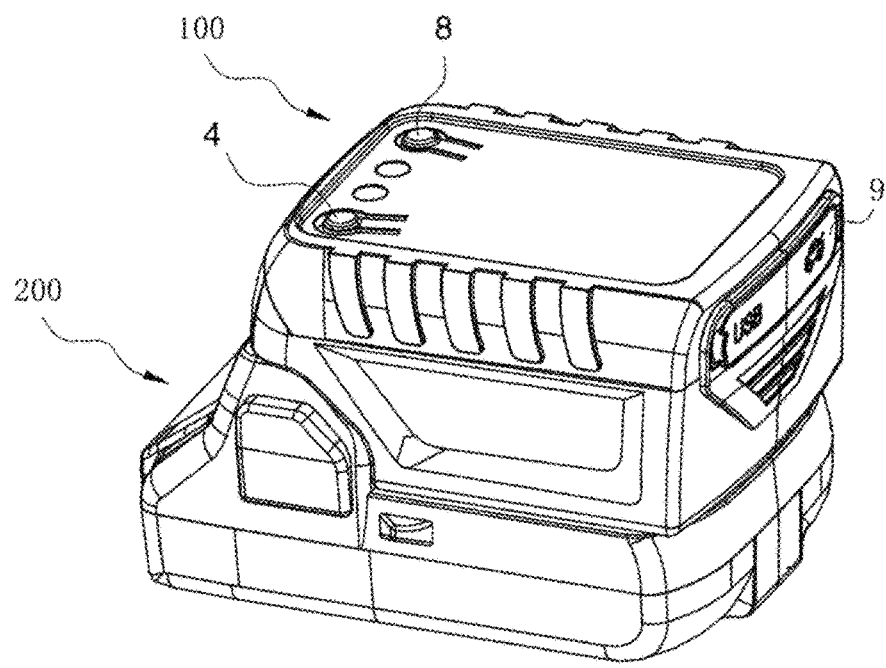
FIG. 4 illustrates a jumpstart adapter in configuration for jumpstarting a vehicle, in accordance with the subject technology.
Figure 5:
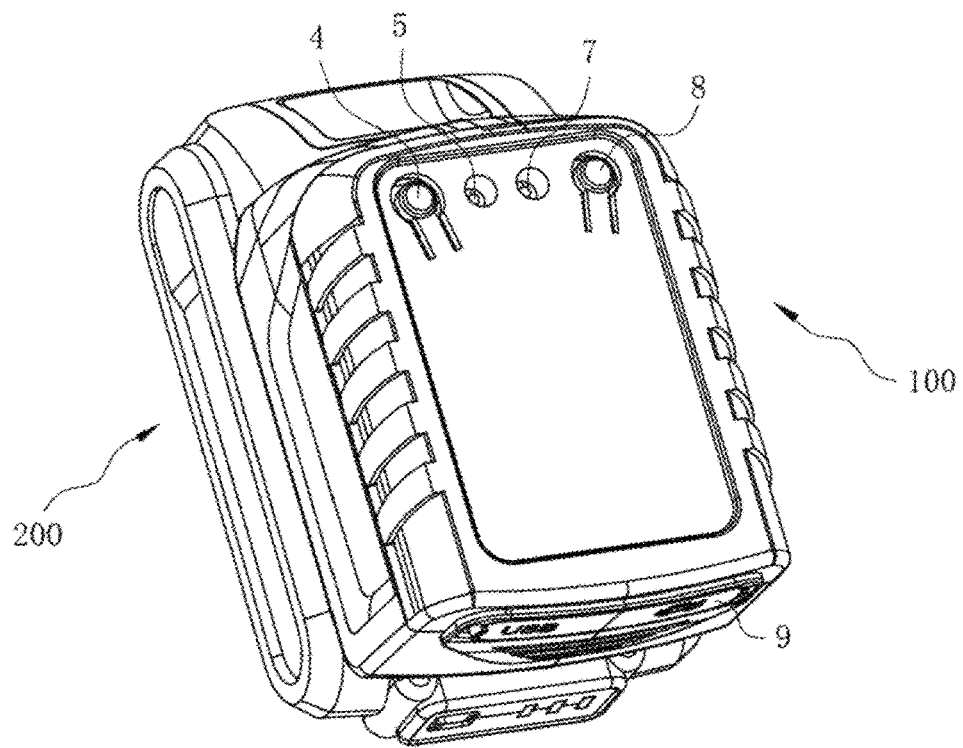
FIG. 5 is a perspective structural view of a jumpstart adapter in configuration for jumpstarting a vehicle, in accordance with the subject technology.
Figure 6:
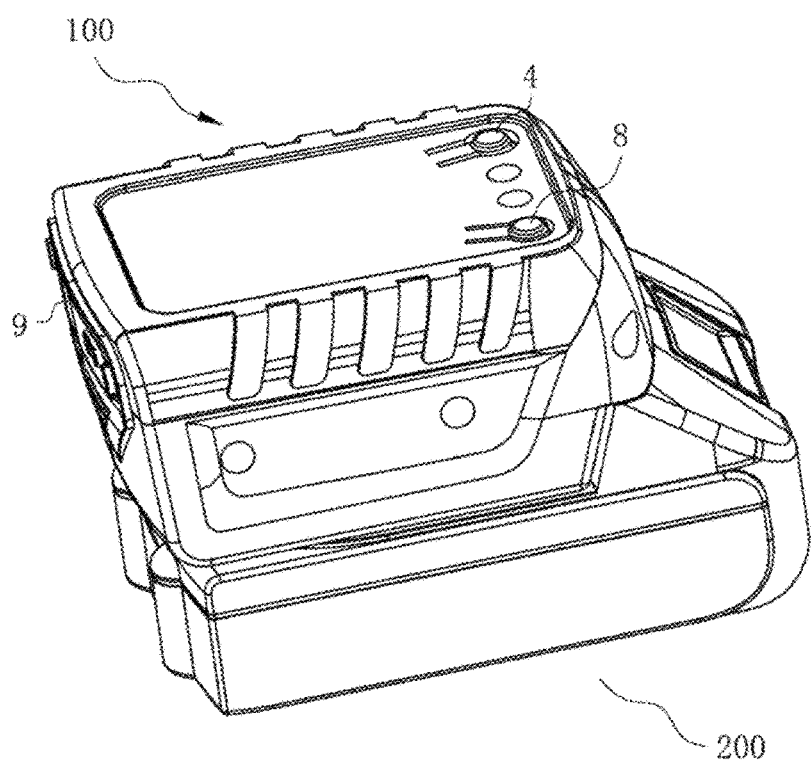
FIG. 6 is a profile structural view of a jumpstart adapter in configuration for jumpstarting a vehicle, in accordance with the subject technology.
Figure 7:
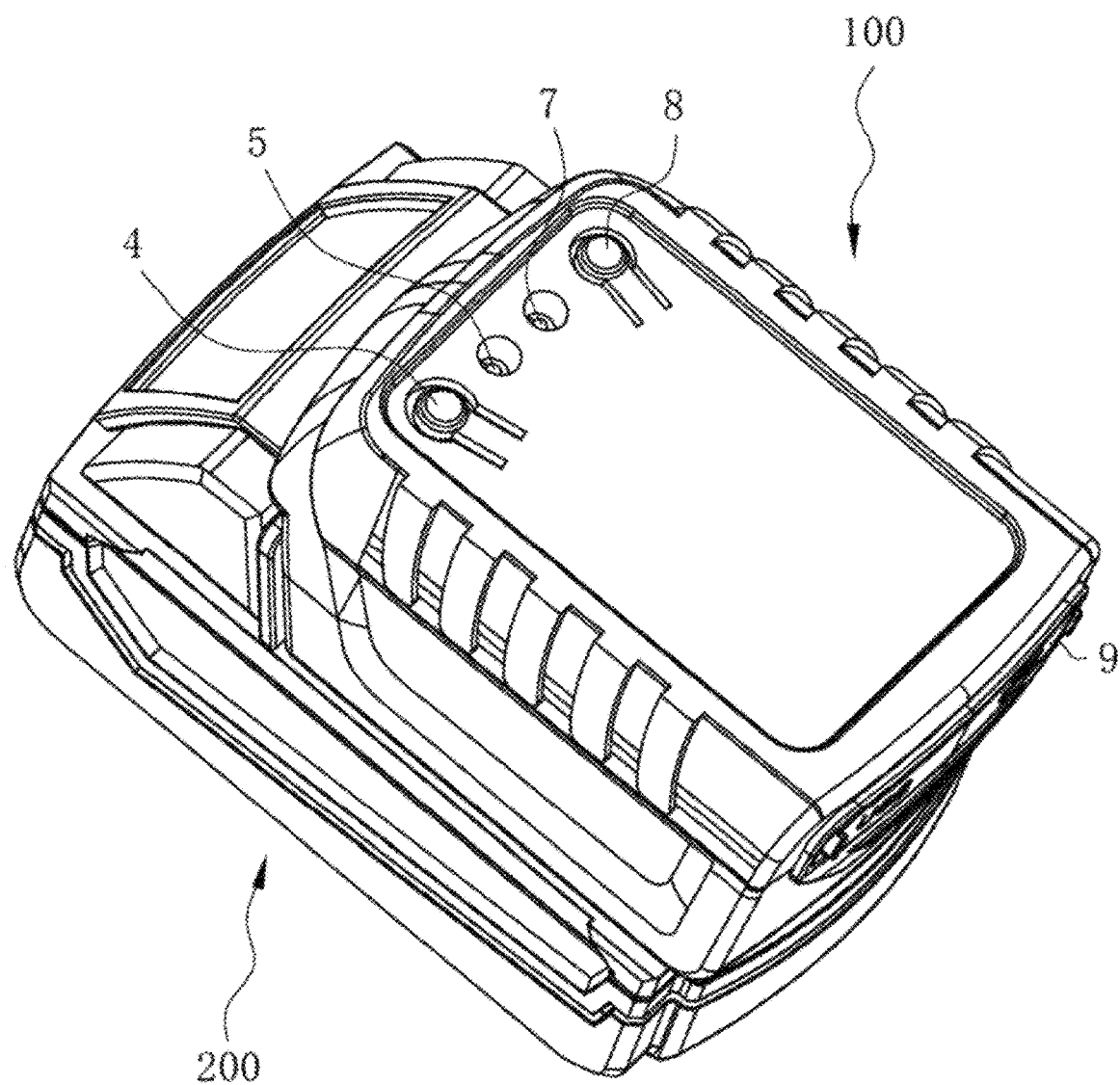
FIG. 7 is a second perspective structural view of a jumpstart adapter in configuration for jumpstarting a vehicle, in accordance with the subject technology.

As shown in FIGS. 1 and 3, a locking structure is provided between the shell 100 and the lithium battery 200 in order to make the connection between the power socket 1 and the lithium battery 200 more firm. Furthermore, the locking structure is disposed between the power supply base 1 and the lithium battery 200. In particular, the locking structure includes grooves 12, provided on opposed sides of the power supply base 1, and convex ribs 22, provided on opposed sides of the lithium battery 200.

The convex ribs 22 and the grooves 12 are arranged one by one correspondingly. The locking structure further includes a notch 13, provided on the bottom of the power supply base 1 or the side of the power supply base 1 including the input terminal 11, and an elastic clamping block 23 provided on the lithium battery 200. When the lithium battery 200 is inserted in the power socket 1 and the output terminal 21 of the lithium battery 200 is electrically connected with the input terminal 11, the convex ribs 22 are correspondingly inserted into the grooves 12 and the elastic clamping block 23 is inserted into the notch 13.

Further, short circuit protection circuit, reverse connection protection circuit, and reverse charge protection circuit are provided on the circuit board and/or in the clamp. In some examples, the circuit board is also provided with a buzzer configured to respond to the reverse connection protection circuit. Here, the short circuit protection circuit, the reverse connection protection circuit, and the reverse charge protection circuit are all provided on the circuit board (not depicted).

As shown in FIGS. 3-6, the shell 100 includes the power switch 8 and the power indicator 7. The power switch 8 and the power indicator 7 are connected to the circuit board to provide direct user control of the emergency start-up power supply of the vehicle. The shell 100 also includes the USB interface 6, the USB indicator 5 and the USB switch 4, which are each connected to the circuit board to facilitate powering and/or charging of smart terminal devices, such as, for example and without imputing limitation, mobile phones, tablet computers, and the like.

To prevent dust from entering the USB interface 6 and the output terminal 3, the USB interface 6 and the output terminal 3 are disposed on the same side of the shell 100. The shell 100 is provided dust cover 9, which is a dust-proof cover for shielding the USB interface 6 and the output terminal 3, among other components of the shell 100.

Generally, to use the automobile jumpstart adapter, the lithium battery 200 is plugged into the power socket 1 to electrically connect the output terminal 21 and the input terminal 11 of the lithium battery 200. The dust cover 9 is then opened and the input terminal of the clamp is connected to the output terminal 3, which is put in conductively coupled to an output terminal of a clamp and, accordingly, the vehicle battery. In this process, the rib 22 is inserted into the groove 12, and the elastic clamping block 23 is inserted into the notch 13 to prevent the lithium battery 200 from coming out of the power socket 1.

When the power switch 8 is pressed, the voltage of the lithium battery 200 is identified through the voltage identification circuit, and the voltage of the lithium battery 200 is converted into the appropriate voltage of the vehicle battery through the voltage conversion circuit. The converted voltage is output through the output terminal 3 to supply power for the starting motor of the vehicle. In this process, when the output terminal of the clamp is electrically connected to the positive and negative poles of the automobile battery, the reverse connection protection circuit controls the circuit board to stop outputting the current. Additionally, the reverse connection protection circuit may alert the user that the attempted configuration is incorrect through the power indicator light 7 and a buzzer. If positive and negative poles of the clamp are electrically connected incorrectly, the short circuit protection circuit controls the circuit board to stop outputting current and protect the lithium battery 200 from being damaged. Further, after the vehicle is started, the reverse charge protection circuit can prevent the high current generated by the vehicle engine from being reversely charged into the lithium battery 200.

Figure 8:
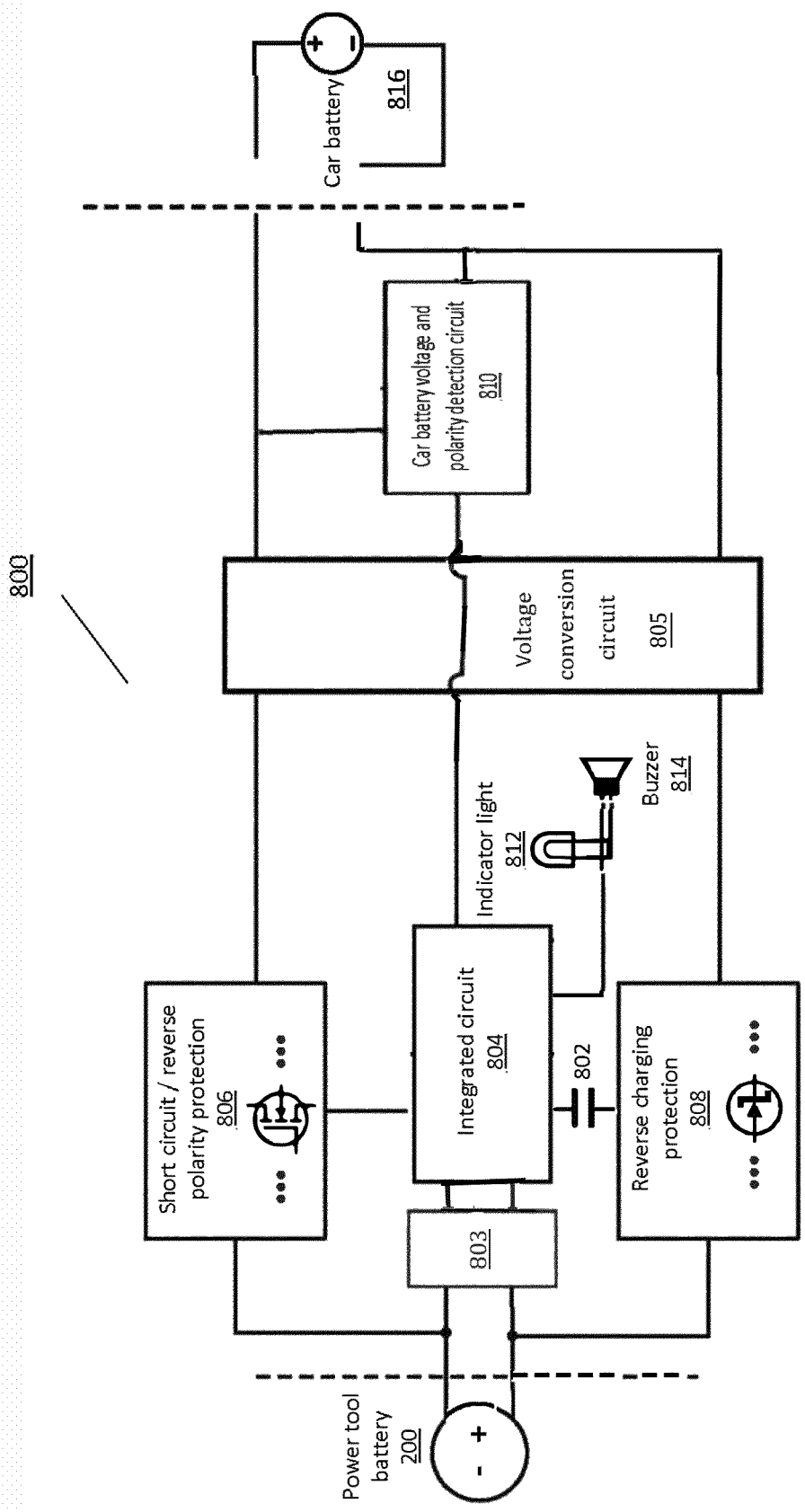
FIG. 8 is a diagram showing an exemplary circuit used to implement the disclosed technology for jumpstart of a car.

FIG. 8 is a diagram showing an exemplary circuit used to implement the disclosed technology for jumpstart of a car. A circuit 800 is powered by the lithium battery 200, and may include a switch 802, a short circuit or reverse polarity protection circuit 806, an integrated circuit 804, a voltage identification circuit 803, a voltage conversion circuit 805, a reverse charging protection circuit 808, an indicator light 812, a buzzer 814, and a voltage and polarity detection circuit 810, which are coupled together and in communication as illustrated in FIG. 8.

The reverse charging protection circuit 808 may include high-power diodes such that the current can only flow in one direction, which can prevent reverse charging of the generator current after the car starts.

When the circuit 800 is connected to the lithium battery 200, the switch 802 is turned on, then the indicator light 812 flashes red and green and enters the standby state.

The voltage and polarity detection circuit 810 is able to detect the polarity of the car battery 816 after being connected to the car battery 816. If the polarity of the car battery 816 is correct, the integrated circuit 804 turns on the indicator light of 812 according to a program, and turns on the short circuit/reverse polarity protection circuit 806 and reverse charging protection circuit 808 to begin a power output.

If the voltage and polarity detection circuit 810 detects a polarity error, such as a reverse circuit or a short circuit, then the indicator light 112 lights up red and the buzzer 814 sounds an alarm, and the short circuit/reverse polarity protection circuit 806 and reverse charging protection circuit 808 remain off. In this case, the circuit 800 does not output power to the car battery 816.

What is claimed is:

1. An automobile jumpstart adapter comprises:
   an enclosure having a shell;
   an input terminal, a jumpstart output terminal, and a circuit board disposed within the shell;
   wherein the circuit board comprises an integrated circuit, a voltage identification circuit, a voltage conversion circuit, and a polarity detection circuit, the polarity detection circuit being in electrical communication with the integrated circuit; and
   a Universal Serial Bus (USB) interface being arranged on a single outer side of the shell as the jumpstart output terminal,
   wherein the input terminal is configured to electrically connect to a portable battery output terminal and the jumpstart output terminal, the voltage identification circuit identifies an appropriate output voltage corresponding to a vehicle battery and the voltage conversion circuit converting power from the portable battery to the appropriate output voltage, wherein the enclosure is configured to be attached on one side of the portable battery.

2. The automobile jumpstart adapter of claim 1, wherein the shell further comprises a power base configured to receive the portable battery, and the input terminal is located on the power base.

3. The automobile jumpstart adapter of claim 2, wherein a locking structure is disposed between the power base and the portable battery.

4. The automobile jumpstart adapter of claim 1, wherein a locking structure is configured to secure the shell to the portable battery when the portable battery is electrically connected to the input terminal.

5. The automobile jumpstart adapter of claim 4, wherein the locking structure comprises one or more convex ribs and one or more grooves, and the one or more convex ribs extending from one or another of the shell or the portable battery, and the one or more grooves extending from the other of the shell or the portable battery, wherein the one or more convex ribs are inserted into the one or more grooves when the portable battery output terminal is electrically connected to the input terminal.

6. The automobile jumpstart adapter of claim 4, wherein the locking structure further includes one or more notches and one or more elastic clamping blocks, the one or more notches a part of one or another of the shell or the portable battery, and the one or more elastic clamping blocks from the other of the shell or the portable battery, wherein the one or more elastic clamping blocks are inserted into the one or more notches when the portable battery output terminal is electrically connected with the input terminal.

7. The automobile jumpstart adapter of claim 1, wherein the circuit board further comprises at least one of a short circuit protection circuit, a reverse connection protection circuit, or a reverse charging protection circuit, and wherein the reverse connection protection circuit is connected to a buzzer.

8. The automobile jumpstart adapter of claim 1, wherein the shell further comprises a power switch and a power indicator, the power switch and the power indicator respectively connected to the circuit board.

9. The automobile jumpstart adapter of claim 1, wherein the shell further comprises one or more of a USB indicator, or a USB switch.

10. The automobile jumpstart adapter of claim 1, further comprising a dust cover for shielding the USB interface and the jumpstart output terminal.

11. A method for jumpstarting an automobile, the method comprising:
    receiving, at a shell of a jumpstart adapter, power from a portable battery at a first voltage, wherein the jumpstart adapter comprises an input terminal, a jumpstart output terminal, and a circuit board disposed within the shell, and a Universal Serial Bus (USB) interface being arranged on a single outer side of the shell as the jumpstart output terminal, wherein the circuit board comprises an integrated circuit, a voltage identification circuit, a voltage conversion circuit, and a polarity detection circuit, the polarity detection circuit being in electrical communication with the integrated circuit;

identifying, by the voltage identification circuit, an appropriate voltage corresponding to a vehicle battery;

converting, by the voltage conversion circuit, the received power from the portable battery to the appropriate voltage identified by the voltage identification circuit;

removing a dust cover that shields the Universal Serial Bus (USB) interface and the jumpstart output terminal on the single outer side of the shell;

determining if the polarity of the vehicle battery is correct by the polarity detection circuit; and if the polarity is correct, attaching the vehicle battery to a side of the shell and providing to the vehicle battery, through the jumpstart output terminal, the received power converted to the appropriate voltage or if the polarity is not correct, no power is provided to the vehicle battery from the portable battery.

12. The method of claim 11, further comprising locking the portable battery into the shell.

13. The method of claim 12, wherein locking the portable battery into the shell further comprises inserting one or more convex ribs into one or more grooves.

14. The method of claim 13, wherein the one or more convex ribs is disposed on the portable battery and the one or more grooves is disposed on the shell.

15. The method of claim 13, wherein the one or more convex ribs is disposed on the shell and the one or more grooves is disposed on the portable battery.

16. The method of claim 11, wherein locking the portable battery into the shell further comprises inserting one or more notches into one or more clamping blocks.

17. The method of claim 16, wherein the one or more notches is located on the shell and the one or more clamping blocks is located on the portable battery.

18. The method of claim 16, wherein the one or more notches is located on the portable battery and the one or more clamping blocks is located on the shell.

19. The method of claim 11, further comprising buzzing a buzzer in response to an incorrectly configured electrical connection between one of the portable battery and the shell or the shell and the vehicle battery, wherein the buzzer is connected to one of a short circuit protection circuit, a reverse connection protection circuit, or a reverse charging protection circuit.

20. The method of claim 11, further comprising powering, through the USB interface, a device using power from the portable battery.

* * * * *